United States Patent [19]

Schupp et al.

[11] Patent Number: 5,086,092
[45] Date of Patent: Feb. 4, 1992

[54] HEAT-CURABLE AQUEOUS COATING AGENT FOR CATHODIC ELECTROCOATING CONTAINING MONOMERIC CHELATING AGENT

[75] Inventors: Hans Schupp, Worms; Thomas Schwerzel, Ludwigshafen; Dirk Lawrenz, Hassloch; Hans-Josef Oslowski; Ulrich Heimann, both of Muenster, all of Fed. Rep. of Germany

[73] Assignee: BASF Lacke+Farben Aktiengesellschaft, Muenster, Fed. Rep. of Germany

[21] Appl. No.: 684,150

[22] Filed: Apr. 12, 1991

Related U.S. Application Data

[63] Continuation of Ser. No. 556,853, Jul. 24, 1990, abandoned, which is a continuation of Ser. No. 278,578, Dec. 1, 1988, abandoned.

[30] Foreign Application Priority Data

Dec. 4, 1987 [DE] Fed. Rep. of Germany ....... 3741161

[51] Int. Cl.⁵ ................................................. C09D 5/44
[52] U.S. Cl. .................................... 523/414; 523/415; 523/416; 523/417; 524/83; 524/106
[58] Field of Search ............... 523/414, 415, 416, 417; 524/83, 106

[56] References Cited

U.S. PATENT DOCUMENTS

| 3,424,663 | 6/1964 | Wiegel | 204/181 |
|---|---|---|---|
| 4,339,368 | 7/1982 | Tsou et al. | 523/414 |
| 4,341,678 | 7/1982 | Georgalas et al. | 523/414 |
| 4,369,290 | 1/1983 | Evans et al. | 523/414 |
| 4,560,717 | 12/1985 | Christenson et al. | 523/415 |

FOREIGN PATENT DOCUMENTS

| 2634211 | 2/1972 | Fed. Rep. of Germany . |
| 2057799 | 1/1973 | Fed. Rep. of Germany . |
| 2131060 | 3/1974 | Fed. Rep. of Germany . |
| 2252536 | 11/1975 | Fed. Rep. of Germany . |
| 2363074 | 1/1976 | Fed. Rep. of Germany . |
| 2265196 | 3/1976 | Fed. Rep. of Germany . |
| 3325061 | 10/1985 | Fed. Rep. of Germany . |
| 3311514 | 2/1986 | Fed. Rep. of Germany . |
| 3444110 | 10/1987 | Fed. Rep. of Germany . |
| 3422457 | 1/1988 | Fed. Rep. of Germany . |

OTHER PUBLICATIONS

Chemical Abstracts, vol. 76, No. 114,892s (1972), [Guruswamy, S. and Jayakrishnan, P., *Metal Finish*, 70(1), 42-5].

*Primary Examiner*—John Kight, III
*Assistant Examiner*—Frederick Krass
*Attorney, Agent, or Firm*—Keil & Weinkauf

[57] ABSTRACT

Heat-curable aqueous coating agents for cathodic electrocoating contain
(A) an amino-containing polymerization, polycondensation or polyaddition product as a binder which becomes water-dilutable on protonation with an acid,
(B) a crosslinking agent and
(C) from 0.05 to 10% by weight, based on components (A) and (B), of a monomeric organic complexing agent.

5 Claims, No Drawings

HEAT-CURABLE AQUEOUS COATING AGENT FOR CATHODIC ELECTROCOATING CONTAINING MONOMERIC CHELATING AGENT

This application is a continuation of application Ser. No. 556,853, filed on July 24, 1990, now abandoned which is a continuation of Ser. No. 278,578, filed on Dec. 1, 1988. now abandoned.

The present invention relates to heat-curable aqueous coating agents for cathodic electrocoating which contain an amino-containing synthetic resin binder, a crosslinking agent and a low molecular weight organic complexing agent and to the preparation and use thereof.

Most of the electrocoating compositions of high throwing power and good corrosion protection customary today contain amino-epoxy resins based on bisphenol A (2,2-bis(4-hydroxyphenyl)propane) and amines and/or amino alcohols, as described for example in DE-A-3,422,457, DE-A-3,325,061 and DE-A-3,444,110. The crosslinking of these binders is usually effected thermally in the course of baking at from 120° to 200° C. The crosslinking may also be effected by reaction with blocked polyisocyanates, as described for example in DE-A-2,057,799, DE-A-2,131,060, DE-A-2,252,536, DE-A-2,265,196, DE-A-2,363,074 and DE-A-2,634,211. Urea condensation products as described in DE-A-3,311,514 may also be used.

Another way of obtaining crosslinking consists in using phenolic Mannich bases as described for example in DE-A-3,422,257.

Although the coating compositions thus obtained have on the whole a positive range of properties, they do show defects in certain areas which appear to disqualify them from use in particularly demanding sectors, for example the coating of car bodies in the automotive industry. In particular, for instance, the adhesion of the paint film to nonpretreated steel and to very smooth metal surfaces was not satisfactory.

A method of improving the adhesion to such critical metal surfaces is described in German Patent Application P 37 36 995.4. Certain amino acids are incorporated covalently into the carrier resin and are supposed to bring about improved adhesion. This way of obtaining adhesion requires frequently long-winded syntheses of carrier resins and is applicable only to specific binders. Moreover, the scope for varying the proportion of amino acids of this type is only fairly narrow.

It is an object of the present invention to find a simpler universally applicable method for obtaining good paint film adhesion.

We have found that this object is achieved by admixing specific low molecular weight complexing agents into the organic solution prior to dispersion or into the ready-produced dispersion.

The present invention accordingly provides a heat-curable aqueous coating agent for cathodic electrocoating, containing (A) an amino-containing polymerization, polycondensation or polyaddition product which becomes water-dilutable on protonation with an acid,
(B) a crosslinking agent and
(C) from 0.05 to 10% by weight, based on components (A) and (B), of a monomeric organic complexing agent, a process for preparing same and a method of using same for coating articles having an electrically conducting surface.

The present invention further concerns the coated article obtained by application of the cathodic electrocoating agent prepared according to the invention and baking.

In what follows, the structural components of the coating agent according to the invention will be described in detail:

Component (A) can be any synthetic resin binder known to the art which contains primary and/or secondary hydroxyl groups and primary, secondary and/or tertiary amino groups and is based on polymerization, polyaddition or polycondensation products such as amino-epoxy resins, amino-poly(meth)acrylate resins and/or amino-polyurethane resins with an amine number of from 30 to 150 and an average molecular weight of from 200 to 20,000. The use of amino-epoxy resins is preferred for basecoats intended to confer a high corrosion protection level. The synthetic resin binder contains at least one amino group per molecule. The lower limit of the amine number should preferably be 45, particularly preferably 70, while the upper limit should preferably be 120, particularly preferably 100. Examples of amino-epoxy resins are reaction products of epoxy-containing resins having preferably terminal epoxy groups with saturated and/or unsaturated secondary and/or primary amines or amino alcohols. The latter may have been modified on the alkyl radical in the form of at least one primary and/or secondary hydroxyl group, in the form of a monoalkylamino or dialkylamino group and/or in the form of a primary amino group temporarily protected by ketiminization.

The epoxy resin used can be any desired material, in particular it should have an average molecular weight of from 300 to 6,000 and contain on average from 1.5 to 3.0 epoxy groups per molecule, preferably compounds having 2 epoxy groups per molecule. Preference is given to epoxy resins having average molecular weights of from 350 to 5,000, in particular of from 350 to 2,000. Particularly preferred epoxy resins are for example glycidyl ethers of polyphenols which contain on average at least 2 phenolic hydroxyl groups in the molecule and are preparable in a conventional manner by etherification with an epihalohydrin in the presence of alkali. Examples of suitable phenol compounds are 2,2,-bis(4-hydroxyphenyl) propane (bisphenol A), 4,4'-dihydroxybenzophenone, 1,1-bis(4-hydroxyphenyl)ethane, 1,1-bis(4-hydroxyphenyl)isobutane, 2,2-bis(4-hydroxytertbutylphenyl)propane, bis(4-hydroxynaphthyl)methane and 1,5-dihydroxynaphthalene. In some cases it is desirable to use aromatic epoxy resins having a higher molecular weight. They are obtained by reacting the abovementioned diglycidyl ethers with a polyphenol, for example 2,2bis(4-hydroxyphenyl)propane, and then further reacting the resulting products with epichlorohydrin to prepare polyglycidyl ethers.

A further class of suitable epoxy resins are polyglycidyl ethers of phenolic novolak resins, by means of which the functionality can be increased from 2 to about 6 glycidyl groups per molecule. Also suitable are polyglycidyl ethers of polyhydric alcohols, as of ethylene glycol, diethylene glycol, triethylene glycol, 1,2-propylene glycol, 1,3-propanediol, 1,5-pentanediol, 1,2,6-hexanetriol, glycerol and 2,2-bis(4-hydroxycyclohexyl)-propane. It is also possible to use polyglycidyl esters of polycarboxylic acids.

Of the preferred polyglycidyl ethers of polyphenols, those having epoxy equivalent weights within the range from 180 to 1,000 are particularly preferred. Aromatic polyepoxies having a higher epoxy equivalent weight can be prepared from those having a lower epoxy equivalent weight and polyphenols.

The amino-epoxy resin can also be modified with saturated or unsaturated polycarboxylic acids and/or hydroxycarboxylic acids. Aliphatic, cycloaliphatic and/or aromatic polycarboxylic acids of different chain lengths are for example adipic acid, sebacic acid, fumaric acid, isophthalic acid and dimeric fatty acid. The hydroxyalkylcarboxylic acids used are lactic acid, dimethylpropionic acid or even carboxyl- and hydroxyl-containing polyesters. The reaction of excess polyglycidyl ether of low molecular weight with polycarboxylic acids and/or polyalcohols gives modified polyglycidyl ether intermediates which then react further with amines and/or amino alcohols.

It is also possible to use heterocyclic epoxy compounds, such as 1,3-diglycidyl-5,5-dimethylhydantoin, triglycidyl isocyanurate or diepoxies of bisimides.

The introduction of amino groups can be carried out in one of the conventional reactions known to those skilled in the art and described for example in EP 134,983, EP 165,556 or EP 166,314.

Suitable crosslinkers for the binder according to the invention are for example aminoplast resins such as urea-formaldehyde resins, melamine resins or benzoguanamine resins, blocked isocyanate crosslinkers, crosslinkers which act by esteraminolysis and/or transesterification and contain on average at least 2 activated ester groups per molecule, for example β-hydroxyalkyl ester crosslinkers as described in EP 0,040,867 and carbalkoxymethyl ester crosslinkers as described in German Patent Application P 32 33 139.8 and urea condensation products as described in DE-A-3,311,514. Further possible crosslinkers consist of phenolic Mannich bases as described for example in DE-A-3,422,457.

The ratio of binder:crosslinker depends on the identity and number of active crosslinking groups in binder and crosslinker. In general, the binder/crosslinker ratio will be from 1:9 to 9:1, but preferably from 1:1 to 9:1, particularly preferably from 1.5:1 to 4:1, based on parts by weight.

According to the invention, the mixture of binder and crosslinker is admixed with a monomeric organic complexing agent having two or more electron donor atoms from the group consisting of O, N and S and containing an aromatic heterocycle having N, O or S atoms in the ring but not more than two heteroatoms in the ring.

Examples of the complexing agent used according to the invention are: pyridine derivatives such as 2-acylated pyridine, 8-hydroxyquinoline, imidazole derivatives such as mercaptobenzimidazole, aminoalkylbenzimidazole or mercaptoalkylbenzimidazole, thiazole derivatives such as mercaptobenzothiazole or aminoalkylbenzothiazole, and fused heterocycles such as 2,2'-bipyridyl-1,10-phenanthroline. Preference is given to benzimidazoles and benzothiazoles, benzothiazole derivatives being particularly preferred.

The complexing agent used according to the invention is used in general within the range 0.05–10%, preferably within the range 0.1–3%, based on the total amount of binder and crosslinker. Its addition can take place either prior to dispersion or not until the coating agent has been ready-dispersed.

Besides the components mentioned hereinbefore, other substances such as pigments, coating assistants, solvents and curing catalysts may be added. The coating agent thus prepared may also be applied to substrates such as wood, plastic or metal in a conventional manner. For electrocoating, the synthetic resin according to the invention is converted into a water-soluble form in conjunction with crosslinkers and the additives mentioned by protonation with an acid. The acid used is preferably a carboxylic acid such as formic acid, acetic acid or lactic acid, but it may also be an inorganic acid, such as phosphoric acid.

For cathodic electrocoating, the solids content of the electrocoating bath is in general from 5 to 30% by weight. Deposition customarily takes place at from 15° to 40° C. in the course of from 0.5 to 5 minutes at a pH of from 4.0 to 8.5, preferably at a neutral pH, while the voltage is within the range from 50 to 500 volts and the electrically conducting article to be coated is connected as the cathode. The deposited film is cured at above 100° C. for about 20 minutes.

EXAMPLES

Intermediate 1

In a vessel equipped with a water separator and a packed column, 12,440 g of hexamethylenediamine, 18,660 g of dimeric fatty acid (Pripol 1014 from Unichema), 3,000 g of linseed oil fatty acid and 2,566 g of xylene were made to react. About 1,150 g of water and 1,750 g of xylene were distilled off in the course of 3–4 hours. The product had an amine number of 233 mg of KOH/g.

Component (A1)

In a reaction vessel, 815 g of diglycidyl ether of 2,2-bis(4-hydroxyphenyl)propane and epichlorohydrin having an equivalent weight of 188, 214.4 g of bisphenol A and 53.6 g of propylglycol monophenyl ether were made to react with 0.26 g of triphenylphosphine. A product having an epoxy equivalent weight of 429 was obtained after 3 hours at a reaction temperature of 130° C. It was diluted with 302 g of isobutanol and 212.4 g of toluene and cooled down to 60° C. Thereafter 70.8 g of methylethanolamine and 351.6 g of intermediate 1 were added, and the mixture was heated to 80° C. After 2 hours epoxy was no longer detectable. The synthetic resin had an amine number of 105 mg of KOH/g, a solids content of 70% by weight and a plate/cone viscosity of 4,000 mPas at 75° C.

Intermediate 2

In a vessel equipped with a water separator, 662 g of intermediate 1 were refluxed with 566 g of methyl isobutyl ketone for 10 hours, during which about 52 g of water were distilled off. The product had an amine number of 134 and a solvent content of 25% by weight.

Component (A2)

In a reaction vessel, 752 g of a diglycidyl ether of 2,2-bis(4-hydroxyphenyl)propane and epichlorohydrin having an equivalent weight of 190, 205 g of bisphenol A and 50 g of propylglycol monophenyl ether were made to react with 0.3 g of triphenylphosphine. 3 hours at a reaction temperature of 130° C. gave a product having an epoxy equivalent weight of 430. It was diluted with 118 g of toluene to a solids content of 85% by weight. 598 g of intermediate 2 and 72 g of ethylethanolamine were then added, and the mixture was heated to 120° C. After 5 hours epoxy was no longer detectable. 273 g of a 9:1 mixture of isobutanol and ethylene glycol mono-n-butyl ether were added to dilute to a solids content of 70% by weight. Crosslinking agent 1 (blocked isocyanate)

666 g of isophorone diisocyanate were heated together with 537 g of toluene and 0.28 g of dibutyltin dilaurate at 60° C. 67 g of 1,1,1-trimethylolpropane and 133 g of a reaction product of about 3 mol of ethylene oxide and 1 mol of 1,1,1-trimethylolpropane were added over 90 minutes. After a further 30 minutes of reaction at 60° C. 387 g of di-n-butylamine were added. The mixture was stirred at 50° C. for 60 minutes. The crosslinker had a solids content of 70% by weight.

Crosslinking Agent 2 (Phenolic Mannich Base)

152 g of bisphenol A, 63 g of a diglycidyl ether of bisphenol A having an epoxy equivalent weight of 189 and 0.1 g of tributylphosphine were heated at 160° C. for 1 hour. Afterwards the epoxy was no longer detectable, and a chain-extending diphenol had formed. 53.8 g of isopropanol, 129 g of di-n-butylamine, 31.5 g of paraformaldehyde and 17.6 g of isobutanol were added and the mixture was heated at 80° C. for 2 hours. The product had a solids content of 80% by weight.

Preparation of a Pigment Paste 640 g of a bisphenol A-epoxy resin having an equivalent weight of 485 and 160 g of same having an epoxy equivalent weight of 189 were mixed at 100° C. A second vessel was charged with 452 g of hexamethylenediamine and heated to 100° C., and 720 g of the hot epoxy resin mixture from above were added in the course of one hour, the mixture having to be cooled slightly in order to maintain the temperature at 100° C. After a further 30 minutes the temperature was raised and the pressure reduced to distil off the excess hexamethylenediamine, reaching a temperature of 205° C. and a pressure of 30 mbar. 57.6 g of stearic acid, 172.7 g of dimeric fatty acid and 115 g of xylene were then added. The water formed was then distilled off azeotropically at from 175° to 180° C. in the course of 90 minutes. 58 g of ethylene glycol mono-n-butyl ether and 322 g of isobutanol were then added. The product had a solids content of 70% by weight and a viscosity, measured at 75° C. with a plate/cone viscometer, of 2,240 mPas.

110 g of the synthetic resin thus obtained were ball-milled together with 36 g of ethylene glycol mono-n-butyl ether, 3 g of acetic acid, 170 g of titanium dioxide, 18 g of lead silicate, 4.5 g of carbon black and 170 g of water to a particle size <7 μm.

Preparation of Dispersion

The respective (A) components were mixed with the stated crosslinking agents in such amounts that the resulting mixture contained 137 g of solids in a mixing ratio of 70% by weight of (A) component and 30% by weight of crosslinking component (B). After addition of 3.1 g of acetic acid, deionized water was added with stirring to prepare a 35% strength by weight dispersion. 139 g of the above-specified pigment paste were added, followed by deionized water to make up to 1,000 g. The electrocoating bath thus prepared was stirred at 30° C. for 7 days. A panel connected as the cathode was then coated at the stated voltage for 2 minutes and subsequently baked at 160° C. for 20 minutes.

The following examples show the application of the binder compositions according to the invention in cathodically depositable electrocoating compositions:

EXAMPLES 1-2

70 parts of component A 1
30 parts of crosslinking agent 1
1 part of complexing agent:
    Example 1: mercaptobenzothiazole
    Example 2: mercaptobenzimidazole

Comparative Example 1

Like Examples 1 and 2, except that no complexing agent was added.

|  | Comparative Example 1 | Example 1 | Example 2 |
|---|---|---|---|
| Bath data: |  |  |  |
| pH | 7.6 | 7.4 | 7.4 |
| Conductivity ($\mu S \times cm^{-1}$) | 2240 | 2440 | 2220 |
| Deposition voltage (V) | 270 | 250 | 260 |
| Film properties: |  |  |  |
| Film thickness ($\mu m$) | 22 | 18 | 20 |
| Underrusting (mm) 480 h ASTM* untreated panel | 4.85 | 1.3 | 1.6 |
| 1,000 h ASTM* phosphated panel | 0.35 | 0.16 | 0.6 |
| 10 cycles of climate cycling test** | 0.71 | 0.42 | 1.3 |

*Salt spray test in accordance with German Standard Specification DIN 50021
**In accordance with German Automative Industry Association test VDA 621415

EXAMPLE 3

70 parts of component A 2
30 parts of crosslinking agent 2
200 ppm of Cu-acetate
1 part of mercaptoimidazole as complexing agent

Comparative Example 2

Like Example 3, except that no complexing agent was added.

|  | Comparative Example 2 | Example 3 |
|---|---|---|
| Bath data: pH | 7.14 | 7.44 |
| Conductivity ($\mu S \times cm^{-1}$) | 2450 | 2620 |
| Deposition voltage (V) | 240 | 240 |
| Film properties: |  |  |
| Film thickness ($\mu m$) | 18 | 19 |
| Underrusting (mm) 480 h ASTM untreated panel | 3.87 | 2.08 |
| 1,000 h ASTM phosphated panel | 0.2 | 0.21 |
| 10 cycles of climate cycling test | 0.46 | 0.46 |

We claim:

1. A heat-curable aqueous coating agent for cathodic electrocoating comprising:
   (A) an amino-containing polymerization, polycondensation or poly addition product as binder which becomes water-dilutable on protonation with an acid,
   (B) a crosslinking agent, and
   (C) from 0.05 to 10% by weight, based on components (A) and (B), of a monomeric organic complexing compound having at least two identical or different heteroatoms chosen from the group consisting of N, O or S atoms and containing an aromatic heterocyclic ring having N, O or S atoms with not more than two heteroatoms being present in said heterocyclic ring.

2. The coating agent of claim 1, containing as complexing agent (C) a derivative of imidazole.

3. The coating agent of claim 1, containing as complexing agent (C) a derivative of thiazole.

4. The coating agent of claim 1, which includes one or more of a pigment, filler, coating assistant or solvent.

5. A process for preparing a coating agent as defined in claim 1, by protonation of a mixture of
  (A) an amino-containing polymerization, polycondensation or polyaddition product as binder and
  (B) a crosslinking agent
with an acid and subsequent dispersion with water, which comprises adding the organic low molecular weight complexing agent (C) to the mixture prior to dispersion.

* * * * *